United States Patent
Ikeda et al.

(10) Patent No.: US 8,978,363 B2
(45) Date of Patent: Mar. 17, 2015

(54) DIESEL PARTICULATE FILTER SYSTEM

(75) Inventors: Takashi Ikeda, Fujisawa (JP); Naofumi Ochi, Fujisawa (JP); Hitoshi Satou, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 47 days.

(21) Appl. No.: 13/703,252

(22) PCT Filed: Jun. 10, 2011

(86) PCT No.: PCT/JP2011/063322
§ 371 (c)(1),
(2), (4) Date: Dec. 10, 2012

(87) PCT Pub. No.: WO2011/155587
PCT Pub. Date: Dec. 15, 2011

(65) Prior Publication Data
US 2013/0084217 A1  Apr. 4, 2013

(30) Foreign Application Priority Data
Jun. 11, 2010 (JP) ................................. 2010-134513

(51) Int. Cl.
*F01N 3/021* (2006.01)
*F01N 3/023* (2006.01)
(Continued)

(52) U.S. Cl.
CPC .......... *B01D 53/9495* (2013.01); *B01D 53/944* (2013.01); *F01N 3/0231* (2013.01); *F01N 3/0253* (2013.01); *F01N 3/035* (2013.01); *F01N 3/106* (2013.01); *F01N 9/002* (2013.01); *F02D 41/029* (2013.01); *F02D 41/1446* (2013.01);
(Continued)

(58) Field of Classification Search
None
See application file for complete search history.

(56) References Cited

U.S. PATENT DOCUMENTS

2007/0044455 A1* 3/2007 Barasa et al. .................. 60/295
2008/0016853 A1* 1/2008 Zhang et al. ................... 60/286

FOREIGN PATENT DOCUMENTS

| EP | 1 741 885 | 1/2007 |
|----|-----------|--------|
| EP | 1 895 131 | 3/2008 |

(Continued)

OTHER PUBLICATIONS

International Search Report of Corresponding PCT Application PCT/JP2011/063322 mailed Aug. 16, 2011.
(Continued)

*Primary Examiner* — Walter D Griffin
*Assistant Examiner* — Jelitza Perez
(74) *Attorney, Agent, or Firm* — Staas & Halsey LLP

(57) ABSTRACT

A diesel particulate filter ("DPF") system that is more convenient than a conventional DPF system, including a DPF having a catalyzed soot filter ("CSF") that is connected to an exhaust pipe of a diesel engine in order to collect particulate matter ("PM") in exhaust gas, and a diesel oxidation catalyst ("DOC") provided on an upstream side of the CSF; and temperature sensors provided respectively on an upstream side and a downstream side of the DOC. When a PM accumulation amount in the CSF exceeds a fixed amount, DPF regeneration is performed by setting a temperature detected by the upstream side temperature sensor at or above a first threshold and setting a temperature detected by the downstream side temperature sensor at or above a second threshold. When a breakdown is detected in the upstream side temperature sensor, the second threshold is modified upward.

2 Claims, 2 Drawing Sheets

(51) Int. Cl.
*F01N 3/035* (2006.01)
*F01N 9/00* (2006.01)
*B01D 53/92* (2006.01)
*B01D 53/94* (2006.01)
*F01N 3/025* (2006.01)
*F01N 3/10* (2006.01)
*F02D 41/02* (2006.01)
*F02D 41/14* (2006.01)
*F02D 41/22* (2006.01)
*B01D 46/42* (2006.01)
*B01D 46/44* (2006.01)

(52) U.S. Cl.
CPC ............ *F02D 41/222* (2013.01); *F01N 3/0235* (2013.01); *B01D 46/42* (2013.01); *B01D 46/448* (2013.01); *F01N 2560/06* (2013.01); *Y02T 10/47* (2013.01); *F01N 2560/14* (2013.01); *B01D 53/9477* (2013.01); *B01D 2255/915* (2013.01); *B01D 2279/30* (2013.01)
USPC .................. 60/287; 60/282; 60/295; 60/299; 422/109; 422/168; 422/170; 422/177

(56) References Cited

FOREIGN PATENT DOCUMENTS

| | | |
|---|---|---|
| FR | 2970299 | 7/2012 |
| JP | 4175281 | 10/2005 |
| JP | 2006-316746 | 11/2006 |
| JP | 2008-138537 | 6/2008 |
| JP | 2010-43572 | 2/2010 |
| JP | 2010-112251 | 5/2010 |

OTHER PUBLICATIONS

Patent Abstracts of Japan, Publication No. 2005-282545, Published Oct. 13, 2005, corresponds to 4175281.
Patent Abstracts of Japan, Publication No. 2008-138537, Published Jun. 19, 2008.
Patent Abstracts of Japan, Publication No. 2010-043572, Published Feb. 25, 2010.
Written Opinion of the International Searching Authority mailed Aug. 16, 2011 in corresponding International Application No. PCT/JP2011/063322.
Patent Abstracts of Japan, Publication No. 2006-316746, published Nov. 24, 2006.
Patent Abstracts of Japan, Publication No. 2008-138537, published Jun. 2008.
Patent Abstracts of Japan, Publication No. 2010-112251, published May 2010.
Abstract of French Publication No. 2970299, Published Jul. 13, 2012.
Extended European Search Report mailed Oct. 31, 2014 in corresponding European Application No. 11792544.6.

\* cited by examiner

US 8,978,363 B2

DIESEL PARTICULATE FILTER SYSTEM

CROSS-REFERENCE TO RELATED APPLICATIONS

This application claims the benefit of Japanese Patent Application No. 2010-134513, filed on Jun. 11, 2010, the contents of which is incorporated herein by reference, which serves as priority for PCT Application No. PCT/JP2011/063322, filed Jun. 10, 2011.

TECHNICAL FIELD

The present invention relates to a Diesel Particulate Filter ("DPF") system that collects PM (Particulate Matter) in exhaust gas from a diesel engine.

BACKGROUND ART

A DPF system that reduces an amount of PM discharged to the outside by collecting PM contained in exhaust gas from a diesel engine in a filter known as a DPF, for example a DPD (Diesel Particulate Defuser) serving as a type of DPF, has been developed.

Similarly to other exhaust gas purification systems (an SCR (Selective Catalytic Reduction) system, for example), a DPF system employing a DPF is provided midway in an exhaust pipe in order to purify exhaust gas and discharge the purified exhaust gas into the atmosphere (see Patent Document 1, for example).

A continuous regeneration type DPF system in which a DOC (Diesel Oxidation catalyst) is provided on an upstream side of the DPF is available as a DPF system. This DPF system makes use of the fact that PM oxidation using $NO_2$ is performed at a low temperature by oxidizing the PM using $O_2$ in the exhaust gas, and performs DPF regeneration by oxidizing NO in the exhaust gas into $NO_2$ using the upstream side DOC and oxidizing PM collected in the downstream side DPF into $CO_2$ using the $NO_2$, whereby the PM is removed.

In this type of DPF system, however, when an exhaust gas temperature is low, a temperature of the DOC decreases such that the DOC becomes inactive, and therefore an oxidation reaction is not promoted. Hence, DPF regeneration through PM oxidation cannot be performed, and as a result, PM continues to accumulate in the DPF, leading to increasing filter blockage.

In response to the filter blockage, when a PM accumulation amount exceeds a predetermined accumulation amount, the PM collected in the DPF is forcibly burned and removed by forcibly raising the exhaust gas temperature to a target temperature (between approximately 500° C. and 600° C., for example).

The PM accumulation amount is commensurate with an output value of a differential pressure sensor that measures a differential pressure of the exhaust gas between a front side and a rear side of the DPF. Therefore, when the output value of the differential pressure sensor exceeds a predetermined differential pressure, an ECU (Engine Control Unit) detects a filter blockage, whereupon the ECU either starts DPF regeneration automatically (automatic regeneration) or, in a case where DPF regeneration is to be performed manually (manual regeneration), illuminates a DPF warning lamp (a DPF lamp) provided in a cabin to prompt a driver to start DPF regeneration by pressing a regeneration execution switch (a manual regeneration execution switch) after stopping a vehicle.

Note that filter blockage detection may be performed on the basis of a traveled distance rather than the differential pressure of the exhaust gas between the front and rear sides of the DPF. In this case, DPF regeneration is started automatically or manually, as described above, when the traveled distance exceeds a predetermined distance.

PRIOR ART DOCUMENTS

Patent Document 1: Japanese Patent Publication No. 4175281

As described above, during DPF regeneration, the exhaust gas temperature is forcibly increased to the target temperature. The exhaust gas temperature is measured using exhaust gas temperature sensors provided respectively on the upstream side and the downstream side of the DOC.

Hence, when the exhaust gas temperature sensors break down, the exhaust gas temperature can no longer be measured, and as a result, the exhaust gas temperature may increase abnormally, causing various apparatuses and devices to break down. In this case, therefore, DPF regeneration is prohibited.

Incidentally, the exhaust gas temperature sensor on the upstream side of the DOC mainly measures an engine out exhaust gas temperature and monitors a case in which the exhaust gas temperature decreases due to sudden release of an engine load during DPF regeneration, while the exhaust gas temperature sensor provided on the downstream side of the DOC normally performs feedback control for setting the exhaust gas temperature at the target temperature. In actuality, therefore, DPF regeneration can still be performed when the exhaust gas temperature sensor on the upstream side of the DOC breaks down.

In other words, when the exhaust gas temperature sensor on the downstream side of the DOC breaks down, DPF regeneration can no longer be performed, and therefore repairs must be performed quickly, but when the exhaust gas temperature sensor on the upstream side of the DOC breaks down, repairs are necessary but not urgent.

In a conventional DPF system, however, DPF regeneration is prohibited uniformly when a breakdown is detected in either of the exhaust gas temperature sensors on the upstream side and the downstream side of the DOC, and as a result, a driver is inconvenienced.

SUMMARY OF THE INVENTION

Therefore, an object of the present invention is to provide a DPF system that is more convenient than a conventional DPF system.

The present invention has been designed to achieve the object described above, and provides a DPF system including: a diesel particulate filter constituted by a filter that is connected to an exhaust pipe of a diesel engine in order to collect PM in exhaust gas, and an oxidation catalyst provided on an upstream side of the filter; and temperature sensors provided respectively on an upstream side and a downstream side of the oxidation catalyst, the DPF system being configured such that, when a PM accumulation amount in the filter exceeds a fixed amount, the diesel particulate filter is regenerated by setting a temperature detected by the temperature sensor on the upstream side of the oxidation catalyst at or above a first threshold and setting a temperature detected by the temperature sensor on the downstream side of the oxidation catalyst at or above a second threshold. In this DPF system, when a breakdown is detected in the temperature sensor on the upstream side of the oxidation catalyst, the second threshold is modified upward.

When a breakdown is detected in the temperature sensor on the downstream side of the oxidation catalyst, regeneration of the diesel particulate filter is preferably prohibited.

According to the present invention, a DPF system that is more convenient than a conventional DPF system can be provided.

DETAILED DESCRIPTION

Preferred embodiments of the present invention will be described below in accordance with the attached drawings.

Figure 1:
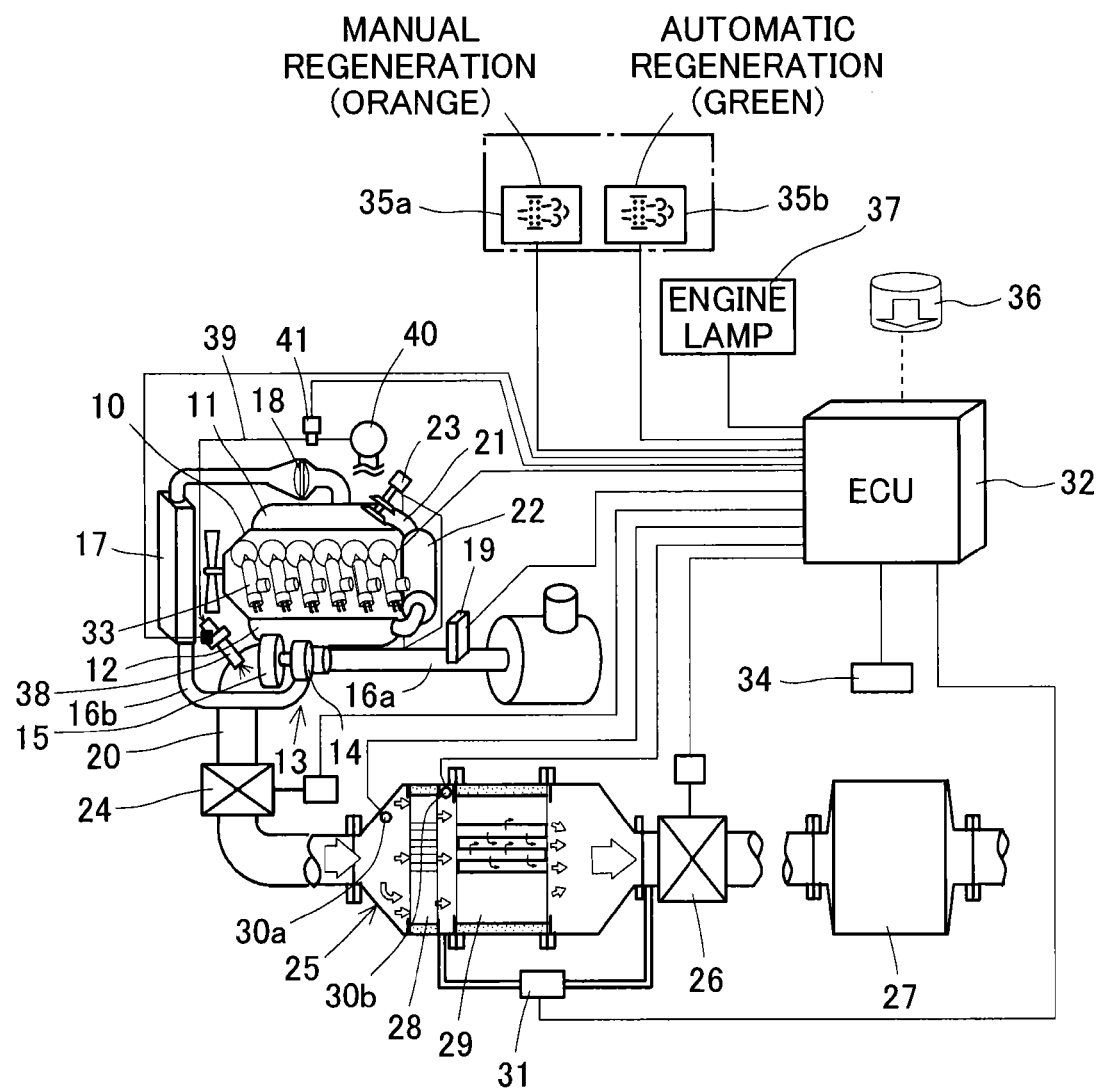
FIG. 1 is a system diagram showing a configuration of a DPF system.

FIG. 1 is a system diagram showing a DPF system.

In FIG. 1, an intake manifold 11 and an exhaust manifold 12 of a diesel engine 10 are coupled respectively to a compressor 14 and a turbine 15 of a turbocharger 13 such that air from an upstream side intake pipe 16a is pressurized by the compressor 14, cooled while passing through an intercooler 17 in a downstream side intake pipe 16b, and supplied from the intake manifold 11 to the diesel engine 10 via an intake throttle (an intake air throttle valve) 18, while exhaust gas from the diesel engine 10 drives the turbine 15 and is then discharged into an exhaust pipe 20.

A MAF (Mass Air Flow) sensor 19 that measures an intake air amount is provided in the upstream side intake pipe 16a to regulate the intake air amount by controlling an opening of the intake throttle 18. Further, an Exhaust Gas Recirculation (EGR) pipe 21 for reducing $NO_x$ by returning a part of the exhaust gas to an intake system of the diesel engine 10 is connected to the exhaust manifold 12 and the intake manifold 11, while an EGR cooler 22 and an EGR valve 23 are connected to the EGR pipe 21.

An exhaust brake valve 24, a DPF 25, an exhaust throttle (an exhaust gas throttle valve) 26, and a silencer 27 are connected to the exhaust pipe 20. The DPF 25 is constituted by a DOC (an oxidation catalyst) 28 formed from an active catalyst that oxidizes unburned fuel, and a filter (a CSF (Catalyzed Soot Filter)) 29 that collects PM in the exhaust gas.

An exhaust pipe injector 38 that injects fuel into the exhaust pipe 20 (performs exhaust pipe injection) in order to raise an exhaust gas temperature during DPF regeneration is provided on an upstream side of the exhaust brake valve 24. A fuel filter 40 that removes generated foreign matter and moisture intermixed in the fuel is connected to a fuel supply line 39 that supplies fuel to the exhaust pipe injector 38 from a fuel tank, not shown in the drawing, and a fuel pressure sensor 41 that measures a fuel pressure in the exhaust pipe injector 38 is provided on a downstream side of the fuel filter 40.

Further, although not shown in FIG. 1, an SCR apparatus is connected between the exhaust throttle 26 and the silencer 27. The SCR apparatus removes $NO_X$ in the exhaust gas by causing the $NO_X$ to react with $NH_3$ such that $N_2$ and $H_2O$ are produced.

Exhaust gas temperature sensors (an upstream side temperature sensor 30a and a downstream side temperature sensor 30b) used to determine whether or not exhaust pipe injection is possible, an exhaust pipe injection amount, and whether or not DPF regeneration is complete are provided respectively on a front side and a rear side of the DOC 28.

Further, a differential pressure sensor 31 that measures a differential pressure of the exhaust gas between a front side and a rear side of the CSF 29 is provided to estimate a PM accumulation amount in the CSF 29.

Output values from these sensors are input into an ECU 32 that performs overall control of an operation of the diesel engine 10 as well as DPF regeneration, whereupon a fuel injector 33 of the diesel engine 10, the exhaust throttle 26, the exhaust brake valve 24, the EGR valve 23, the exhaust pipe injector 38, and so on are controlled by control signals output from the ECU 32.

Information such as an accelerator opening from an accelerator position sensor, an engine rotation speed from a rotation speed sensor, and a vehicle speed from a vehicle speed sensor 34 and information such as an engine cooling water temperature are also input into the ECU 32 in order to operate the diesel engine 10.

Further, a DPF warning lamp 35a and a DPF warning lamp 35b provided in a cabin for use during manual regeneration and automatic regeneration, respectively, a manual execution switch 36 used by a driver to execute manual regeneration, a check engine lamp 37 that is illuminated when a defect occurs in the diesel engine 10 to inform a user thereof, and so on are connected to and controlled by the ECU 32.

In this system, air is passed through the MAF sensor 19 in the upstream side intake pipe 16a, pressurized by the compressor 14 of the turbocharger 13, cooled while passing through the intercooler 17 in the downstream side intake pipe 16b, and then introduced into a cylinder of the diesel engine 10 from the intake manifold 11 via the intake throttle 18.

Meanwhile, exhaust gas generated in the cylinder passes through the exhaust manifold 12 so as to drive the turbine 15, and is then purified by an exhaust gas purification system constituted by the DPF 25 and the SCR apparatus, muffled by the silencer 27, and discharged into the atmosphere. A part of the exhaust gas is cooled by the EGR cooler 22, adjusted in quantity by the EGR valve 23, and then recirculated to the intake manifold 11.

The exhaust gas contains PM, and the PM is collected by the DPF 25. Under normal circumstances, so-called DPF regeneration is performed continuously in the DPF 25 by oxidizing NO in the exhaust gas into $NO_2$ using the DOC 28 and oxidizing the PM collected in the downstream side CSF 29 into $CO_2$ using the $NO_2$, whereby the PM is removed.

When the exhaust gas temperature is low, however, a temperature of the DOC 28 decreases such that the DOC 28 becomes inactive, and therefore an oxidation reaction is not promoted. Hence, DPF regeneration through PM oxidation cannot be performed, and as a result, PM continues to accumulate in the CSF 29, leading to increasing filter blockage.

In response to the filter blockage, when the PM accumulation amount exceeds a predetermined accumulation amount, the PM collected in the CSF 29 is forcibly burned and removed by forcibly increasing the exhaust gas temperature.

The PM accumulation amount is commensurate with the output value of the differential pressure sensor 31. Therefore, when the output value of the differential pressure sensor 31 exceeds a predetermined differential pressure (a differential pressure threshold), the ECU 32 detects a filter blockage, whereupon the ECU 32 either performs DPF regeneration automatically or illuminates the DPF warning lamp 35a to prompt the driver to perform DPF regeneration by pressing the regeneration execution switch 36. DPF regeneration in which a start timing of the DPF regeneration is determined from the differential pressure in this manner is known as differential pressure-based regeneration. Hereafter, DPF regeneration performed automatically by the ECU 32 will be referred to as automatic regeneration, while regeneration performed manually by the driver will be referred to as manual regeneration.

Note that the DPF regeneration start timing may be determined according to whether or not a traveled distance calculated on the basis of the vehicle speed measured by the vehicle speed sensor 34 has exceeded a predetermined distance (a distance threshold) rather than from the output value of the differential pressure sensor 31. DPF regeneration in which the start timing of the DPF regeneration is determined from the traveled distance in this manner is known as distance-based regeneration.

Examples of manual regeneration and automatic regeneration will now be described.

Manual regeneration is performed when a vehicle is stopped. When the user starts manual regeneration by pressing the regeneration execution switch 36 after stopping the vehicle, the fuel injector 33, the diesel engine 10, the exhaust brake valve 24 or exhaust throttle 26, the EGR valve 23, and the intake throttle 18 are controlled by the ECU 32 to raise the exhaust gas temperature to a temperature at which the DOC 28 is activated.

More specifically, the ECU 32 controls the fuel injector 33 to start multi-injection, controls the diesel engine 10 to increase the engine rotation speed, closes the exhaust brake valve 24 or the exhaust throttle 26 to realize a rapid temperature increase, closes the EGR valve 23 to prevent fuel circulation, and controls the intake throttle 18 to throttle the intake air amount such that a temperature reduction is suppressed and a load is increased.

Note that the DOC 28 is determined to be active when a detection value of the upstream side temperature sensor 30*a* reaches or exceeds a preset upstream side threshold (a first threshold) and a detection value of the downstream side temperature sensor 30*b* reaches or exceeds a preset downstream side threshold (a second threshold). In other words, activation of the DOC 28 is determined from the detection values of both the upstream side temperature sensor 30*a* and the downstream side temperature sensor 30*b*.

Once the DOC 28 is activated, exhaust pipe injection is started together with the multi-injection by controlling the exhaust pipe injector 38, whereupon the exhaust gas temperature is raised further to a target temperature by opening the exhaust brake valve 24 and closing the exhaust throttle 26 when the exhaust brake valve 24 is closed, or maintaining a condition in which the exhaust brake valve 24 is open and the exhaust throttle 26 is closed when the exhaust throttle 26 is closed.

At this time, the target temperature is set in two stages, for example 500° C. and 600° C., and controlled by the ECU 32 such that each target temperature is maintained for a predetermined time. The target temperature is set in multiple stages to prevent heat generated when the PM burns from melting the CSF 29. More specifically, during an initial period of DPF regeneration in which a large amount of PM remains, a large amount of heat is generated when the PM burns, and therefore the target temperature is set on a lower side. During a latter period of DPF regeneration in which the amount of PM has decreased through combustion, on the other hand, the target temperature is set high in order to burn the PM efficiently.

Thereafter, the ECU 32 controls the fuel injector 33 to return to normal injection, closes the exhaust pipe injector 38, controls the diesel engine 10 to return the engine rotation speed to a normal idle condition, opens the exhaust throttle 26, returns the EGR valve 23 to normal (i.e. opens the EGR valve 23), and returns the intake throttle 18 to normal (i.e. opens the intake throttle 18). As a result, the exhaust gas temperature decreases, whereby manual regeneration is complete.

During manual regeneration, DPF regeneration is performed when the vehicle is stationary, and therefore the exhaust gas temperature can be kept stable such that the PM can be burned efficiently and reliably. On the other hand, during manual regeneration, the vehicle must be stopped and kept stationary for a predetermined time.

Next, automatic regeneration will be described.

Automatic regeneration is performed while the vehicle travels. When automatic regeneration is started by the ECU 32, the ECU 32 controls the fuel injector 33, the diesel engine 10, the EGR valve 23, and the intake throttle 18 to raise the exhaust gas temperature to the temperature at which the DOC 28 is activated. In contrast to manual regeneration, automatic regeneration is performed during travel, and therefore the exhaust brake valve 24 cannot be closed. Instead, an exhaust pressure is increased by closing the exhaust brake valve 24 when the vehicle stops at a traffic light or the like, and as a result, the exhaust gas temperature is raised and maintained.

Once the DOC 28 is activated (a reference for determining activation of the DOC 28 is identical to that described above), exhaust pipe injection is started together with the multi-injection by controlling the exhaust pipe injector 38, whereby the exhaust gas temperature is raised further to the target temperature. Since travel is underway, the exhaust throttle 26 also cannot be closed, and therefore the exhaust throttle 26 is kept open at all times.

After the exhaust gas temperature has been raised to the target temperature and maintained at the target temperature for a predetermined time, the ECU 32 controls the fuel injector 33 to return to normal injection, closes the exhaust pipe injector 38, controls the diesel engine 10 to return the engine rotation speed to normal, returns the EGR valve 23 to normal (i.e. opens the EGR valve 23), and returns the intake throttle 18 to normal (i.e. opens the intake throttle 18). As a result, the exhaust gas temperature decreases, whereby automatic regeneration is complete.

With automatic regeneration, DPF regeneration is performed while the vehicle travels, and therefore automatic regeneration is more convenient than manual regeneration. During automatic regeneration, however, the exhaust gas temperature tends to be unstable or not to increase easily.

Hence, automatic regeneration and manual regeneration each have merits and demerits, and are therefore preferably selected and used appropriately according to conditions. For example, automatic regeneration and manual regeneration are selected on the basis of a regeneration interval, which is a traveled distance from the end of one DPF regeneration operation to the start of a following DPF regeneration operation.

When the PM is not removed sufficiently during a previous DPF regeneration operation, the regeneration interval may shorten, or in other words PM may accumulate in the DPF in an amount exceeding the threshold even though the traveled distance is short. Therefore, when the regeneration interval is smaller than a manual regeneration threshold, manual regeneration, in which DPF regeneration can be performed with stability, is selected to ensure that the PM is removed reliably.

During both types of DPF regeneration, the exhaust gas temperature is forcibly raised to the target temperature, and measurement of the exhaust gas temperature is performed by the exhaust gas temperature sensors (the upstream side temperature sensor 30*a* and the downstream side temperature sensor 30*b*) provided respectively on the upstream side and the downstream side of the DOC 28.

In other words, when the PM accumulation amount in the CSF 29 exceeds a fixed amount, diesel particulate filter regeneration is performed by setting a temperature detected by the upstream side temperature sensor 30a at or above the first threshold and setting a temperature detected by the downstream side temperature sensor 30b at or above the second threshold.

Hence, when the upstream side temperature sensor 30a or the downstream side temperature sensor 30b breaks down, the exhaust gas temperature can no longer be measured, and as a result, the exhaust gas temperature may increase abnormally, causing various apparatuses and devices to break down. In this case, therefore, DPF regeneration is prohibited.

In other words, in a DPF system, DPF regeneration is prohibited in a case where a breakdown is detected in either the upstream side temperature sensor 30a or the downstream side temperature sensor 30b during DPF regeneration performed when the PM accumulation amount in the CSF 29 exceeds the fixed amount. Note that breakdown of the upstream side temperature sensor 30a and the downstream side temperature sensor 30b is detected by the ECU 32.

Incidentally, the upstream side temperature sensor 30a mainly measures an engine out exhaust gas temperature and monitors a case in which the exhaust gas temperature decreases due to sudden release of an engine load during DPF regeneration, while the downstream side temperature sensor 30b normally performs feedback control for setting the exhaust gas temperature at the target temperature. In actuality, therefore, DPF regeneration can still be performed when the upstream side temperature sensor 30a breaks down.

In other words, when the downstream side temperature sensor 30b breaks down, DPF regeneration can no longer be performed, and therefore repairs must be performed quickly, but when the upstream side temperature sensor 30a breaks down, repairs are necessary but not urgent.

In a conventional DPF system, however, DPF regeneration is prohibited uniformly when a breakdown is detected in either of the temperature sensors 30a, 30b on the upstream side and the downstream side of the DOC 28, and as a result, the driver is inconvenienced.

The DPF system according to this embodiment solves this problem by permitting DPF regeneration as long as the downstream side temperature sensor 30b is normal, regardless of whether or not the upstream side temperature sensor 30a has broken down.

More specifically, when the downstream side temperature sensor 30b is normal and a breakdown is detected in the upstream side temperature sensor 30a, the temperature threshold (downstream side threshold) of the downstream side temperature sensor 30b for detecting activation of the DOC 28 is modified upward and DPF regeneration is permitted. The reason for modifying the downstream side threshold upward will be described below.

When the exhaust gas temperature on the downstream side of the DOC 28 increases, the exhaust gas temperature on the upstream side of the DOC 28 naturally also increases.

However, a temperature difference exists between the upstream side and the downstream side of the DOC 28, and therefore, even when the exhaust gas temperature on the downstream side of the DOC 28 is sufficiently high for DPF regeneration, it is impossible to determine that the exhaust gas temperature on the upstream side of the DOC 28 has increased sufficiently. Hence, when DPF regeneration is performed using only the exhaust gas temperature on the downstream side of the DOC 28, the DOC 28 may not be sufficiently activated, and as a result, DPF regeneration may not be performed up to expectations.

To avoid this, a determination must be made as to whether or not the exhaust gas temperature on the upstream side of the DOC 28 is sufficiently high for DPF regeneration. When the upstream side temperature sensor 30a is normal, this determination can be made directly by determining whether or not the detection value of the upstream side temperature sensor 30a equals or exceeds the upstream side threshold. When the upstream side temperature sensor 30a breaks down, however, this is impossible. In this DPF system, therefore, the detection value of the upstream side temperature sensor 30a is estimated when the upstream side temperature sensor 30a breaks down.

The detection value of the upstream side temperature sensor 30a is estimated by determining a detection value of the downstream side temperature sensor 30b at a point where the detection value of the upstream side temperature sensor 30a equals or exceeds the upstream side threshold in advance through experiment or the like, modifying the downstream side threshold upward to the determined value when the upstream side temperature sensor 30a breaks down, and estimating that the detection value of the upstream side temperature sensor 30a has reached or exceeded the upstream side threshold when the detection value of the downstream side temperature sensor 30b reaches or exceeds the modified downstream side threshold.

In other words, in this DPF system, the downstream side threshold is modified upward in order to estimate that the detection value of the upstream side temperature sensor 30a has reached or exceeded the upstream side threshold.

Figure 2:
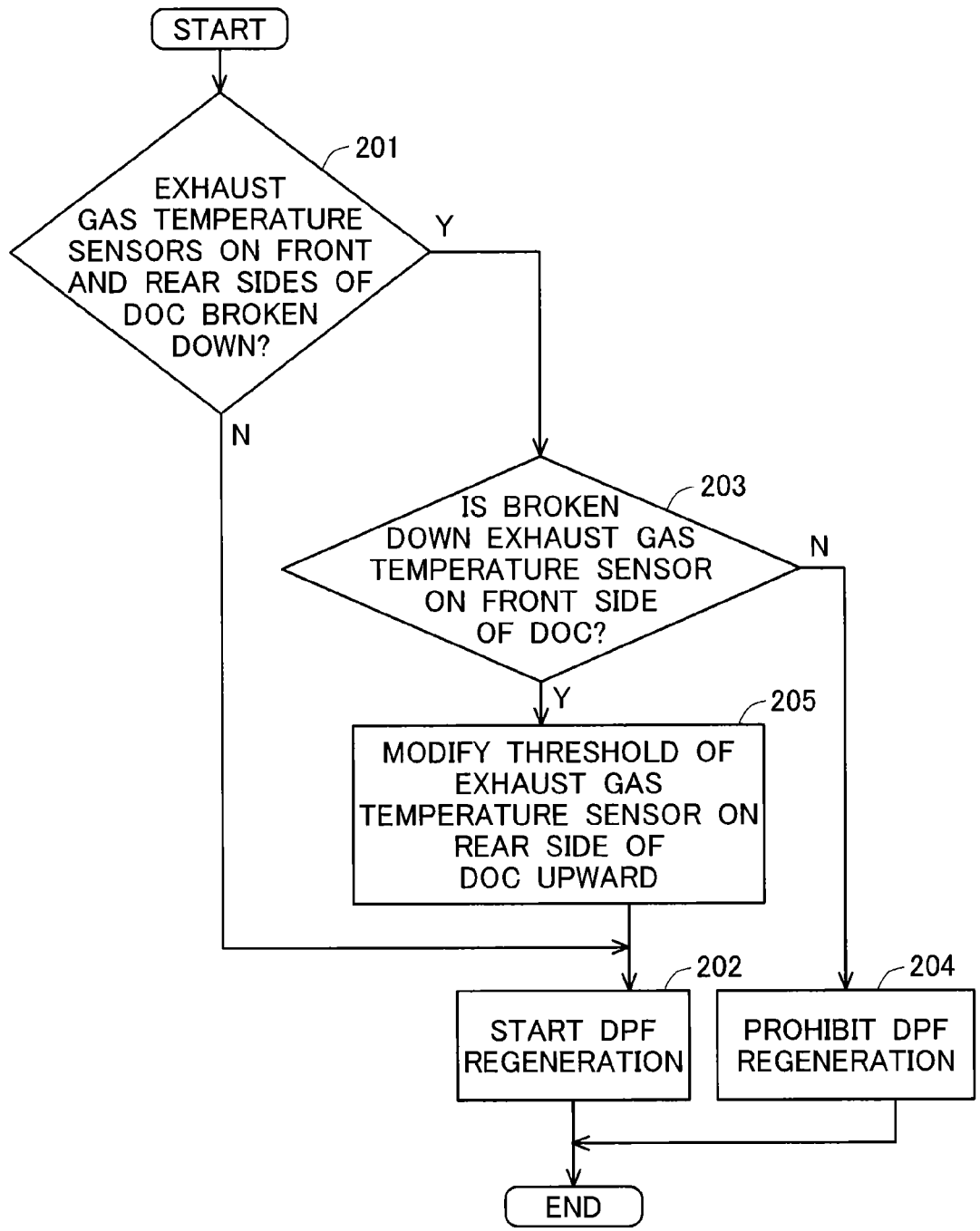
FIG. 2 is a view illustrating an operation of the DPF system.

An operation of the DPF system is summarized on a flowchart shown in FIG. 2.

The DPF performs following steps repeatedly.

As shown in FIG. 2, when DPF regeneration is to be performed, the DPF system determines whether or not a breakdown has occurred to the front or rear of the DOC 28, or in other words in the upstream side temperature sensor 30a or the downstream side temperature sensor 30b (Step 201).

When it is determined in Step 201 that neither the upstream side temperature sensor 30a nor the downstream side temperature sensor 30b has broken down, DPF regeneration is started (Step 202).

When it is determined in Step 201 that a breakdown has occurred in either the upstream side temperature sensor 30a or the downstream side temperature sensor 30b, on the other hand, a determination is made as to whether or not the broken down exhaust gas temperature sensor is on the DOC front side, or in other words the upstream side of the DOC 28 (Step 203).

When it is determined in Step 203 that the downstream side temperature sensor 30b has broken down, DPF regeneration is prohibited (Step 204).

When it is determined in Step 203 that the upstream side temperature sensor 30a has broken down, on the other hand, the downstream side threshold is modified upward to the predetermined experimental value (Step 205) and DPF regeneration is started (Step 202).

According to the DPF system described above, when the downstream side temperature sensor 30b is normal, DPF regeneration is permitted regardless of whether or not the upstream side temperature sensor 30a has broken down. Therefore, situations in which the user is prompted to perform repairs quickly even though the repairs are not urgent can be reduced, enabling an improvement in user convenience over a conventional DPF system.

Further, when the downstream side temperature sensor 30b is normal and a breakdown is detected in the upstream side temperature sensor 30a, the downstream side threshold of the downstream side temperature sensor 30*b* for detecting activation of the DOC 28 is modified upward and DPF regeneration is permitted. Therefore, activation of the DOC 28 can be determined accurately even when the upstream side temperature sensor 30*a* breaks down, and as a result, DPF regeneration can be performed up to expectations.

The invention claimed is:

1. A diesel particulate filter system, comprising:
   a diesel particulate filter connected to an exhaust pipe of a diesel engine to collect particulate matter in exhaust gas;
   an oxidation catalyst provided on an upstream side of the filter;
   a first temperature sensor provided on an upstream side of the oxidation catalyst;
   a second temperature sensor provided on a downstream side of the oxidation catalyst;
   a sensor to detect a particulate matter accumulation amount in the filter; and
   an engine control unit to which the first and second temperature sensors and the particulate matter sensor are connected, the engine control unit being configured such that, when the particulate matter accumulation amount exceeds a fixed amount, the filter is regenerated by the engine control unit by setting a temperature detected by the first temperature sensor at or above a first threshold and setting a temperature detected by the second temperature sensor at or above a second threshold,
   wherein the engine control unit detects whether there is a breakdown in the first and second temperature sensors, and
   wherein, when the engine control unit detects the breakdown in the first temperature sensor, the engine control unit increases the second threshold and continues the regeneration.

2. The system according to claim 1, wherein the engine control unit is further configured such that, when the breakdown is detected in the second temperature sensor, the engine control unit prohibits the regeneration.

* * * * *